(12) United States Patent
Matsubara et al.

(10) Patent No.: US 10,293,414 B2
(45) Date of Patent: May 21, 2019

(54) DRILLING METHOD, DRILLING JIG, AND HEAT EXCHANGER

(71) Applicant: MITSUBISHI HITACHI POWER SYSTEMS, LTD., Kanagawa (JP)

(72) Inventors: Ryo Matsubara, Tokyo (JP); Junji Noda, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/866,976

(22) Filed: Jan. 10, 2018

(65) Prior Publication Data

US 2018/0147640 A1 May 31, 2018

Related U.S. Application Data

(62) Division of application No. 14/441,871, filed as application No. PCT/JP2013/084070 on Dec. 19, 2013.

(30) Foreign Application Priority Data

Jan. 10, 2013 (JP) ................................ 2013-002746

(51) Int. Cl.
B23B 47/28 (2006.01)
B23Q 3/06 (2006.01)
B23B 39/06 (2006.01)

(52) U.S. Cl.
CPC .............. *B23B 39/06* (2013.01); *B23B 47/28* (2013.01); *B23B 47/287* (2013.01);
(Continued)

(58) Field of Classification Search
CPC ........ B23Q 3/06; B23Q 3/069; B23B 47/287; B23B 47/28; B23B 39/06;
(Continued)

(56) References Cited

U.S. PATENT DOCUMENTS 652,251 A 6/1900 Cunningham
724,116 A 3/1903 Maley
(Continued)

FOREIGN PATENT DOCUMENTS

CN 1265620 9/2000
CN 101331330 12/2008
(Continued)

OTHER PUBLICATIONS

International Search Report dated Feb. 10, 2014 in International Application No. PCT/JP2013/084070.
(Continued)

*Primary Examiner* — Ryan C Rufo
(74) *Attorney, Agent, or Firm* — Wenderoth, Lind & Ponack, L.L.P.

(57) ABSTRACT

A drilling method for forming a plurality of through-holes in a plate member includes: a first step of fixing at least one jig, which has a clearance hole, on a bed of a machine tool; a second step of placing the plate member on the at least one jig and fixing the plate member on the bed; a third step of operating the machine tool so that a leading end portion of a drilling tool of the machine tool is inserted into the clearance hole, and forming a first through-hole at a position of the plate member corresponding to the clearance hole; a fourth step of passing a fixing member through the first through-hole, and fixing the plate member on the at least one jig using the fixing member; and a fifth step of operating the machine tool to form a second through-hole other than the first through-hole.

5 Claims, 6 Drawing Sheets

(52) U.S. Cl.
CPC ............ *B23B 2247/12* (2013.01); *B23Q 3/06* (2013.01); *B23Q 3/069* (2013.01); *Y10T 408/03* (2015.01); *Y10T 408/569* (2015.01)

(58) Field of Classification Search
CPC ........... B23B 2247/121; B23B 2247/04; Y10T 408/97; Y10T 408/98; Y10T 408/569
See application file for complete search history.

(56) References Cited

U.S. PATENT DOCUMENTS

| | | | | |
|---|---|---|---|---|
| 2,208,480 | A | * | 7/1940 | Smith ................ B23B 47/28 408/97 |
| 2,351,243 | A | * | 6/1944 | Vetter ................ B23B 47/28 29/271 |
| 2,384,071 | A | * | 9/1945 | Boyer ................ B23B 47/28 33/520 |
| 2,388,320 | A | * | 11/1945 | Gardiner ............ B23B 47/28 269/70 |
| 2,392,804 | A | * | 1/1946 | Basolo ............... B23B 47/28 219/98 |
| 2,915,789 | A | * | 12/1959 | Dykstra ............. B23B 47/28 24/569 |
| 2,920,509 | A | * | 1/1960 | Overton ............. B23B 47/28 29/517 |
| 3,148,562 | A | | 9/1964 | Moss |
| 3,578,799 | A | | 5/1971 | Davis |
| 4,005,945 | A | | 2/1977 | Gutman |
| 4,679,969 | A | | 7/1987 | Riley |
| 5,005,814 | A | | 4/1991 | Gumbert |
| 5,501,437 | A | | 3/1996 | Kisslig |
| 6,022,009 | A | | 2/2000 | Hill |
| 6,058,807 | A | | 5/2000 | Fujii et al. |
| 6,105,951 | A | | 8/2000 | Shibata et al. |
| 6,244,795 | B1 | | 6/2001 | Fenelon |
| 8,152,428 | B2 | | 4/2012 | Rowe et al. |
| 2004/0037662 | A1 | | 2/2004 | Kaneko et al. |
| 2004/0136798 | A1 | | 7/2004 | Sasagawa et al. |
| 2009/0036281 | A1 | | 2/2009 | Piggott |
| 2012/0207562 | A1 | | 8/2012 | Piggott et al. |
| 2014/0301798 | A1 | | 10/2014 | Koike et al. |

FOREIGN PATENT DOCUMENTS

| | | | |
|---|---|---|---|
| CN | 201862818 | | 6/2011 |
| CN | 201862819 | | 6/2011 |
| DE | 359808 C | * 9/1922 | ............ B23B 47/28 |
| DE | 202009005279 | | 2/2011 |
| EP | 2113324 | | 11/2009 |
| JP | 64-12711 | | 1/1989 |
| JP | 1-60815 | | 4/1989 |
| JP | 5-116013 | | 5/1993 |
| JP | 5-146905 | | 6/1993 |
| JP | 6-27283 | | 7/1994 |
| JP | 7-234092 | | 9/1995 |
| JP | 11-320223 | | 11/1999 |
| JP | 2009-519138 | | 5/2009 |
| KR | 10-1127792 | | 3/2012 |

OTHER PUBLICATIONS

International Preliminary Report on Patentability dated Jul. 23, 2015 in International Application No. PCT/JP2013/084070.
First Office Action dated Mar. 25, 2016 in Chinese Application No. 201380060165.1 (with English translation).
Notice of Preliminary Rejection dated Jun. 10, 2016 in Korean Application No. 10-2015-7012765 (with English translation).
The Decision to Grant a Patent dated Jul. 8, 2016 in Japanese Application No. 2013-002746 (with English translation).
Extended European Search Report dated Jul. 18, 2016 in European Application No. 13871073.6.
Notification of Grant of Invention Patent dated Nov. 7, 2016 in Chinese Application No. 201380060165.1 (with English translation).
Notice of Allowance dated Nov. 28, 2016 in Korean Application No. 10-2015-7012765 (with English translation).
Restriction Requirement dated Mar. 17, 2017 in U.S. Appl. No. 14/441,871.
Office Action dated Jun. 19, 2017 in U.S. Appl. No. 14/441,871.
Notice of Allowance dated Nov. 8, 2017 in U.S. Appl. No. 14/441,871.

* cited by examiner

DRILLING METHOD, DRILLING JIG, AND HEAT EXCHANGER

TECHNICAL FIELD

The present disclosure relates to a drilling method and a drilling jig for forming through-holes in a plate member, and to a heat exchanger.

BACKGROUND ART

Commonly, plate members having a plurality of through-holes, such as a tube plate and a tube support plate of a condenser, are drilled with a machine tool on which a drilling tool such as a high-speed steel drill or a cemented carbide drill is mounted. During drilling, typically, the drilling tool is inserted into a plate member while the outer peripheral part of the plate member is fixed with a clamp. At this point, if the rigidity around the drilling position is low, the plate member becomes bent due to insertion of the drilling tool or the plate member vibrates due to rotation of the drilling tool, which may degrades the machining accuracy of through-holes, and may further cause breakage of the cutting edge of the drilling tool. Therefore, it is required to fix the plate member so as to provide the plate member with sufficient rigidity to withstand drilling.

There is a known method in which, in order to enhance the rigidity of a plate member, a dummy plate is laid on the lower surface of the plate member during drilling, and the plate member and the dummy plate are drilled together with a drilling tool. In this case, since the dummy plate provides the plate member with a reaction force during insertion of the machining tool, significant bending of the plate member can be prevented. However, since the drilling tool rotating at a high speed may cause the plate member to bounce and break the drilling tool, it is necessary to ease the machining conditions of the drilling tool (tool rotational speed, tool feeding speed). Moreover, it takes time and effort to remove foreign matters from or take care of the dummy plate due to its large area of contact with a plate member, and since the dummy plate needs to be prepared for each of plate members having different hole arrays, storage cost is incurred.

A fixing method not using a dummy plate is disclosed in Japanese Patent Publication No. H11-320223, for example, in which spacers are interposed between each adjacent ones of a plurality of plate members stacked on a receiving cleat of a surface plate, and the outer peripheral part of the plate members is fixed with clamps. Japanese Patent Publication No. H5-146905 discloses a method in which the outer periphery of a plate member is fixed with clamps, and the plate member is supported from the drilling tool side by means of cylinders which move on rails. Japanese Utility Model Publication No. S64-12711 discloses a configuration in which a thrust force absorbing member made of a square bar, etc. is provided between a plate member and a bed so as to absorb the thrust force of a drill and vibration during boring. In this configuration, a pressing member which presses the plate member near a part to be bored is further provided to thereby prevent breakage of the drill due to bouncing of the plate member.

Technical Problem

As a tool used for drilling, a cemented carbide drill capable of high-speed machining is known. Although the cemented carbide drill rotates at a higher speed than a high-speed steel drill and allows reduction of machining time, large vibration occurs during insertion of the drill, which is likely to cause bouncing of a plate member. Moreover, while the high-rigidity, low-ductility cemented carbide drill bit is capable of high-accuracy machining, it is prone to a failure such as breakage of the cutting edge due to bouncing of a plate member etc. Thus, there is a demand for a plate member fixing method which allows smooth drilling even with a drilling tool like the cemented carbide drill for which the machining conditions are severe.

On the other hand, when the periphery of a plate member is fixed with clamps alone as in Japanese Patent Publication No. H11-320223, the restraining force around a machining point is weak and it is difficult to sufficiently secure the rigidity of the plate member. Therefore, vibration or bouncing of the plate member occurs during drilling, so that the accuracy of through-holes is affected and a failure such as breakage of the cutting edge is likely to occur. Although spacers are interposed between each adjacent ones of the plurality of plate members in Japanese Patent Publication No. H11-320223, these spacers are required for chamfering of the holes and not intended for a fixing purpose. In terms of fixing the plate member, the spacers serve only to support the reaction force during insertion of the drilling tool and not to enhance the restraining force, so that possible bouncing of the plate member cannot be avoided. In Japanese Patent Publication No. H5-146905 and Japanese Utility Model Publication No. S64-12711, too, the restraining force on the plate member is insufficient when the plate member is pressed from one side with the cylinders or the pressing member alone, so that bouncing of the plate member may occur.

Moreover, in Japanese Patent Publication No. H5-146905, since the spacers are laid under a tube plate, unless the number of holes is small and the hole array is a simple one with a square pitch, etc., it is difficult to dispose the spacers due to possible interference between the drilling tool and the spacers. Thus, it is difficult to apply this method to drilling of plate members having a complicated hole array and a large number of through-holes, such as a tube plate and a tube support plate of a condenser. Similarly, in Japanese Utility Model Publication No. S64-12711, since the absorbing member is disposed across the entire width of the plate member, application of this method is difficult depending on the hole array of a plate member.

Furthermore, in Japanese Utility Model Publication No. S64-12711, since it is necessary to perform a pressing operation using the pressing member on each machining point, one problem is that the machining time is long, and another problem is that chips generated during drilling may be caught between the plate member and a presser foot of the pressing member, which would cause a failure in the pressing operation.

SUMMARY OF INVENTION

An object of at least one embodiment of the present invention is to provide a drilling method and a drilling jig, with which through-holes of an arbitrary hole array can be formed and precise through-holes can be formed while avoiding troubles such as breakage of a drilling tool, and a heat exchanger.

Solution to Problem

According to at least one embodiment of the present invention, there is provided a drilling method for forming a plurality of through-holes in a plate member using a machine tool having a drilling tool equipped with a cemented carbide drill, the drilling method including: a first step of fixing at least one jig, which has a clearance hole, on a bed of the machine tool; a second step of placing the plate member on the at least one jig and fixing the plate member on the bed with a clamp; a third step of operating the machine tool so that a leading end portion of the drilling tool, which has penetrated the plate member, is inserted into the clearance hole, and forming a first through-hole of the plurality of through-holes at a position of the plate member corresponding to the clearance hole; a fourth step of passing a fixing member through the first through-hole, and fixing the plate member on the at least one jig using the fixing member; and a fifth step of, after the fourth step, operating the machine tool to form a second through-hole other than the first through-hole of the plurality of through-holes.

The clearance hole in this specification is not limited in its shape, and holes of various shapes, for example, circular holes and polygonal holes including rectangular holes can be adopted, as long as the clearance hole has such a size that a clearance is formed between the outline of the drilling tool and the clearance hole.

According to the above-described drilling method, vibration, bouncing, etc. of the plate member during insertion of the drilling tool are suppressed, so that it is possible to drill at a high speed and reduce the machining time. Moreover, it is possible to form through-holes of an arbitrary hole array and form precise through-holes while avoiding troubles such as breakage of the drilling tool.

In some embodiments, in the first step, the at least one jig is positioned with reference to a machining origin of the machine tool and the at least one jig is fixed on the bed, and in the second step, the plate member is positioned with reference to the machining origin and the plate member is placed on the at least one jig.

In this embodiment, since at least one jig is positioned with reference to the machining origin of the machine tool and the plate member is also positioned with reference to this machining origin, it is possible to dispose at least one jig with high accuracy in a predetermined positional relation with the plate member.

In some embodiments, in the second step, the outer peripheral side of the plate member relative to a jig disposition area of the at least one jig is fixed on the bed with the clamp, and in the third step, the first through-hole is formed while the jig disposition area of the plate member is supported from below with the at least one jig and the outer peripheral side of the plate member is fixed with the clamp.

Thus, since the reaction force of the plate member is received by the jig which supports the jig disposition area from below while the restraining force on the plate member is secured by the clamp which fixes the outer peripheral side relative to the jig disposition area, it is possible to drill properly even when a large number of through-holes are located in a central part of the plate member. The region where the first through-holes and the second through-holes are arrayed shall be referred to as the jig disposition area.

In some embodiments, the first through-holes are through-hole of the plurality of through-holes which are closest to intersections between a virtual longitudinal division line extending in the longitudinal direction and a virtual lateral division line extending in the lateral direction which divide the jig disposition area of the plate member in a lattice shape.

Thus, since the jigs are disposed at substantially regular intervals in the jig disposition area in the central part of the plate member, it is possible to enhance the rigidity of the plate member in the jig disposition area substantially uniformly, which allows more proper drilling.

According to at least one embodiment of the present invention, there is provided a drilling jig which assists a forming work of a plurality of through-holes in a plate member using a machine tool having a drilling tool, the drilling jig including: a base part which can be fixed on a bed of the machine tool; and a stand part of which an upper portion comes into contact with the lower surface of the plate member while a lower portion is connected with the base part, wherein a clearance hole, into which a leading end portion of the drilling tool having penetrated the through-hole can be inserted, is formed in the upper portion of the stand part, and under the clearance hole, an engaging part is provided which engages a fixing member for fixing the plate member passed through the through-hole and the clearance hole.

According to the above-described drilling jig, it is possible to receive the reaction force during insertion of the drilling tool with the stand part by drilling the plate member using the drilling tool while fixing the base part on the bed and placing the plate member on the stand part. Moreover, it is possible to fix the plate member on the bed side through the drilling jig by engaging the fixing member for fixing the plate member with the drilling jig while the fixing member is passed through the through-hole of the plate member and the clearance hole of the stand part. Thus, since the rigidity of the plate member can be enhanced, it is possible to suppress vibration and bouncing of the plate member during formation of other through-holes and form precise through-holes while preventing troubles such as breakage of the drilling tool.

In some embodiments, the engaging part is a female thread of which the diameter at the root is smaller than the inner diameter of the through-hole and which is screw-engaged with a male thread provided in the fixing member.

In this configuration, the fixing member is engaged with the female thread formed in the stand part and having a diameter smaller than the inner diameter of the through-hole. Thus, it is possible to fix the plate member on the bed by screw-engaging the fixing member, which has the male thread formed in it, with the female thread through the through-hole of the plate member and the clearance hole.

In some embodiments, the clearance hole has an inner diameter larger than the inner diameter of the through-hole.

Thus, since the clearance hole is formed in the upper portion of the stand part, it is possible to prevent the stand part from being cut by the leading end portion of the drilling tool having penetrated the through-hole.

In some embodiments, a cavity portion is formed in the lower portion of the stand part under the female thread, and a chip outlet, which communicates with the cavity portion and through which chips generated by drilling of the through-holes in the plate member are discharged, is provided in the stand part or the base part.

Thus, since the cavity portion for collecting chips generated by drilling is provided in the lower portion of the stand part and the chip outlet for discharging the chips collected in the cavity portion is provided in the stand part or the base part, it is possible to smoothly discharge the chips generated by drilling from the drilling jig to the outside.

In some embodiment, the base part extends along a direction perpendicular to the stand part, and a slit or a long hole, through which a leading end portion of a fastening member for fastening the base part on the bed can be passed, is formed in the base part along the extension direction of the base part.

Thus, it is possible to finely adjust the mounting position of the drilling jig on the base part by adjusting the position of the fixing member in the longitudinal direction of the slit or the long hole formed in the base part.

A heat exchanger according to at least one embodiment of the present invention includes a tube plate or a tube support plate constituted of the plate member in which the through-holes are formed by the above-described drilling method.

Advantageous Effects of Invention

According to at least one embodiment of the present invention, it is possible to drill at a high speed and reduce the machining time. In addition, it is possible to form through-holes of an arbitrary hole array, and form precise through-holes by suppressing vibration, bouncing, etc. of a plate member during insertion of a drilling tool while avoiding troubles such as breakage of the drilling tool.

DESCRIPTION OF EMBODIMENTS

Figure 1:
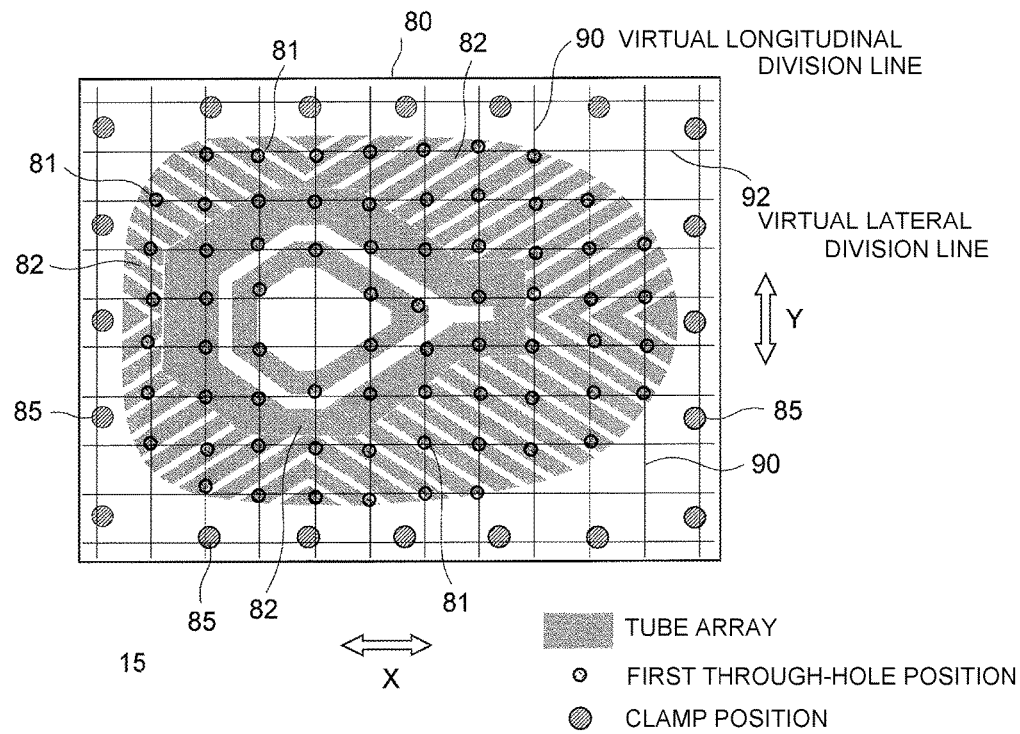
FIG. 1 is a plan view schematically showing a tube plate of a condenser to which embodiments of the present invention are applied.

In the following, embodiments of the present invention will be described in accordance with the accompanying drawings. The dimensions, materials, shapes, relative positions, etc. of components that will be described below as embodiments or are shown in the drawings as embodiments are merely illustrative examples, and it is not intended to limit the scope of the present invention to these examples.

Figure 2:
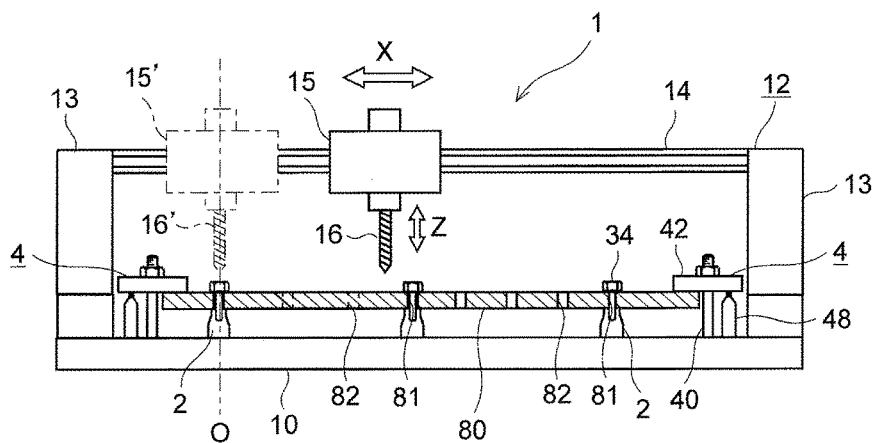
FIG. 2 is a side view showing the general configuration of a machine tool according to one embodiment of the present invention.
Figure 3:
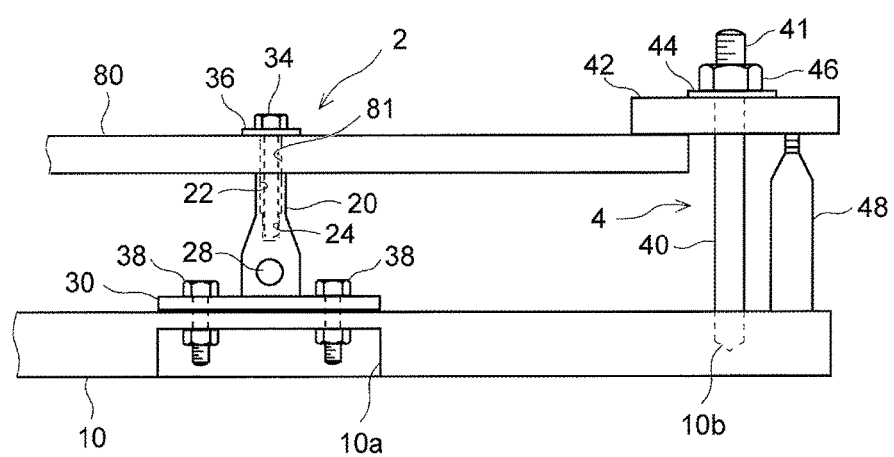
FIG. 3 is a side view showing a drilling jig and a clamp mechanism according to one embodiment of the present invention.
Figure 4:
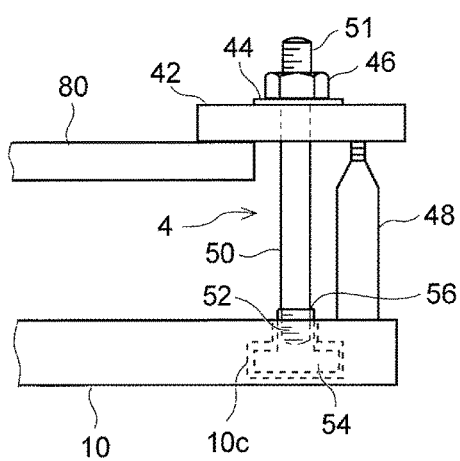
FIG. 4 is a side view showing another configuration example of the clamp mechanism.

FIG. 1 is a plan view showing a tube plate of a condenser to which embodiments of the present invention are applied. FIG. 2 is a side view showing the general configuration of a machine tool according to one embodiment of the present invention. FIG. 3 is a side view showing a drilling jig and a clamp mechanism according to one embodiment of the present invention. FIG. 4 is a side view showing another configuration example of the clamp mechanism.

In the following embodiment, a tube plate of a condenser will be taken as an example of a plate member 80 to be machined. However, the object to be machined is not limited to this example, and the plate member 80 may be any plate member in which a plurality of through-holes are to be formed.

As shown in FIG. 1, a large number of through-holes 81, 82 for heat transfer tubes to pass through are formed in a tube plate being the plate member 80. In the tube plate, the hole array, in which the large number of through-holes 81, 82 (or places at which through-holes are to be formed) are arrayed, is typically an array of a triangular pitch or a square pitch, and a drilling method and a drilling jig 2 according to this embodiment can also be suitably applied to such arrays. As the plate member 80 having a hole array similar to that of a tube plate, a tube support plate may also be an object to be machined. In FIG. 1, the hole array composed of a plurality of through-holes including the first through-holes 81 and the second through-holes 82 are indicated as the shaded region in the drawing. Although the shapes of the second through-holes 82 are not shown, the plurality of second through-holes 82 are formed in a region of the shaded region except where the first through-holes 81 are present. In FIG. 1, clamp positions 85, at which the plate member 80 is fixed with a clamp mechanism 4 to be described later, are shown on the outer peripheral part of the plate member 80.

In one embodiment, as shown in FIG. 2 and FIG. 3, a machine tool 1 for drilling the plate member 80 includes a bed 10 on which the plate member 80 is fixed, the drilling jig 2 used for forming the first through-holes 81 and fixing the plate member 80 on the bed 10, the clamp mechanism 4 used for fixing the plate member 80 on the bed 10, and a drilling mechanism 12 for drilling the through-holes 81, 82 in the plate member 80.

The bed 10 is used for fixing the plate member 80 to be machined. More specifically, the bed 10 is provided with a jig fixing part 10a on which the drilling jig 2 is fixed, and a clamp fixing part 10b on which the clamp mechanism 4 is fixed. In addition, the drilling mechanism 12 is disposed on the bed 10. The plate member 80 fixed on the bed 10 is drilled from above by the drilling mechanism 12.

The drilling mechanism 12 has at least one pair of support pillars 13 provided upright on the bed 10, rails 14 suspended between the at least one pair of support pillars 13, a tool driving part 15 which moves on the rails 14 in the longitudinal direction (the X direction shown in FIG. 1 and FIG. 2), and a drilling tool 16 mounted on the tool driving part 15. The drilling tool 16 is rotated by the tool driving part 15, and moves up and down in the height direction (the Z direction shown in FIG. 2). As the drilling tool 16, for example, a high-speed steel drill, a cemented carbide drill, or the like is used. The pair of support pillars 13 may be adapted to move in the depth direction (the Y direction shown in FIG. 1) along with the rails 14, the tool driving part 15, and the drilling tool 16. In this way, through-holes can be formed at arbitrary positions of the plate member 80 shown in FIG. 1.

The drilling jigs 2 are fixed on the bed 10 at positions corresponding to the first through-holes 81, and assist the forming work of the plurality of through-holes 81, 82 in the plate member 80. The detailed configuration of the drilling jig 2 will be described later.

The clamp mechanism 4 has a bolt 40 fixed on the bed 10, a presser plate 42 which is mounted on the bolt 40 and presses the plate member 80, a nut 46 for fixing the presser plate 42 at a predetermined position, and a jack 48 which supports the presser plate 42 from the lower surface on the opposite side of the plate member 42 across the bolt 40. With the objective of preventing damage to the presser plate 42, a washer 44 may be interposed between the presser plate 42 and the nut 46. In addition, an actuator such as a cylinder or a motor may be used instead of the jack 48.

More specifically, the bolt 40 is implanted in the clamp fixing part 10b of the bed 10 so as to stand upright in the vertical direction. A male thread 41 is formed on the upper end side of the bolt 40. The presser plate 42 is provided with a through-hole (not shown), and the upper end side of the bolt 40 is passed through this through-hole. As the washer 44 and the nut 46 are fitted sequentially and the nut 46 is screw-engaged with the male thread 41 of the bolt 40 on the upper end side of the bolt 40, a pressing force toward the bed 10 side is imparted from the presser plate 42 to the plate member 80, and the presser plate 42 is fixed on the bed 10 side. In order to prevent inclination of the presser plate 42, the jack 48 is provided which supports the presser plate 42 from the lower surface on the opposite side of the plate member 42 across the bolt 40. This jack 48 is adjusted so as to be substantially at the same level as the upper surface of the plate member 80 and supports the presser plate 42 from the lower surface on the opposite side of the plate member 42. In this way, it is possible to impart a pressing force to the plate member 80 while retaining the presser plate 42 in the horizontal direction.

As shown in FIG. 4, in another configuration example, the clamp mechanism 4 may have a bolt 50 which is removal from the bed 10. The bolt 50 has male threads 51, 52 formed at both ends. Similarly to the example of FIG. 3 described above, as the presser plate 42, the washer 44, and the nut 46 are fitted on the upper end side of the bolt 50 and the male thread 51 in the upper portion and a female thread 47 of the nut 46 are screw-engaged with each other, a pressing force is imparted from the presser plate 42 to the plate member 80. On the other hand, a clamp fixing part 10c of the bed 10 has a concave shape, and a nut 54 having a T-shaped cross-section is housed in this clamp fixing part 10c. The nut 54 is fixed so as not to rotate inside the clamp fixing part 10c. A female thread is formed on the inner peripheral side of the nut 54, and this female thread 56 is screw-engaged with the male thread 52 in the lower portion of the bolt 50. In this way, the bolt 50 can be removably fixed on the bed 10. For example, if the plurality of clamp fixing parts 10c and the nuts 54 are installed in advance on the outer periphery of the plate member 80, the clamp mechanisms 4 can be installed only at those positions that are appropriately selected.

Figure 5A:
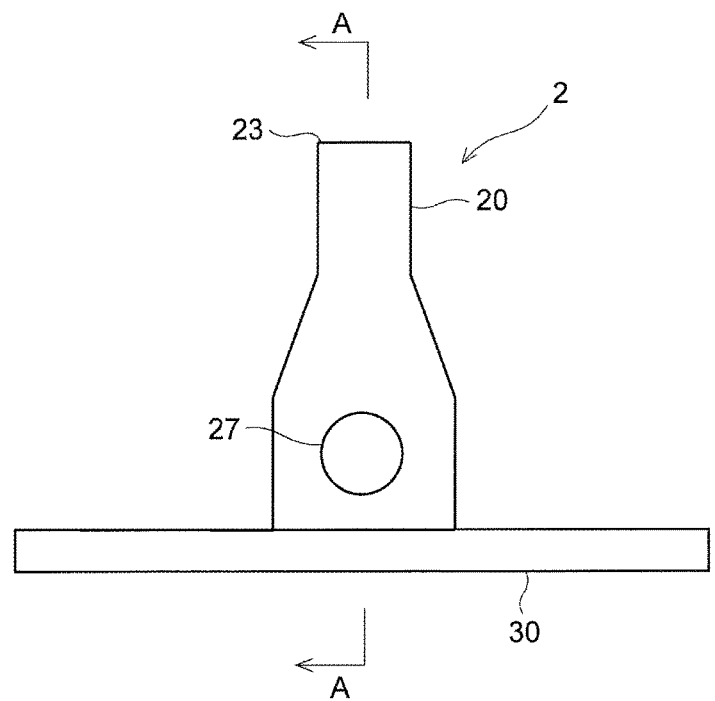
FIG. 5(a) and FIG. 5(b) are a side view and a bottom view, respectively, of the drilling jig according to one embodiment of the present invention.
Figure 5B:
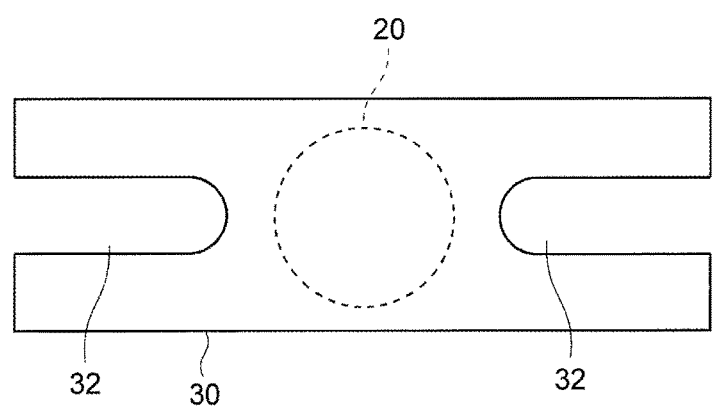
Figure 6:
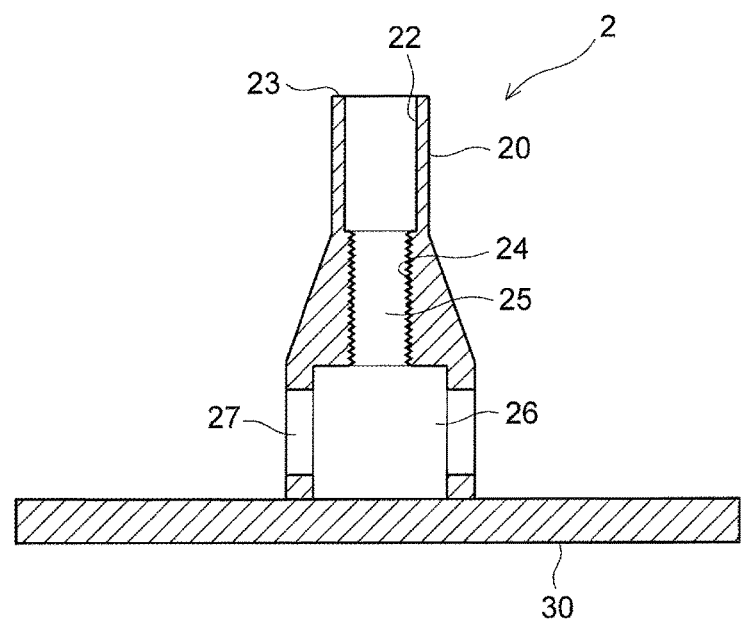
FIG. 6 is a cross-sectional view along the line A-A of FIG. 5.

Here, the configuration of the drilling jig 2 according to one embodiment of the present invention will be described in detail with reference to FIG. 3, FIG. 5, and FIG. 6. FIG. 5(a) and FIG. 5(b) are a side view and a bottom view, respectively, of the drilling jig according to one embodiment of the present invention. FIG. 6 is a cross-sectional view along the line A-A of FIG. 5.

In one embodiment, the drilling jig 2 includes a base part 30 which can be fixed on the bed 10, and a stand part 20 of which an upper portion comes into contact with the lower surface of the plate member 80 while a lower portion is connected with the base part 30. During formation of the first through-hole 81, the drilling jig 2 supports the periphery of the first through-hole 81 from below and serves to receive the reaction force of the drilling tool 16, and during formation of the second through-hole 82, the drilling jig 2 fixes the plate member 80 on the bed 10 with the plate member fixing bolt (fixing member) 34 for fixing the plate member 80, and serves to increase the rigidity of the plate member 80. The first through-holes 81 are those through-holes that are formed first of the plurality of through-holes, and after formation of the through-holes, the plate member fixing bolt 34 is inserted into the drilling jig 2 through the first through-hole 81 to thereby fix the plate member 80. The second through-holes 82 are those through-holes that are formed while the plate member 80 is fixed on the drilling jig 2 through the first through-hole 81.

A clearance hole 22, into which a leading end portion of the drilling tool 16 having penetrated the first through-hole 81 of the plate member 80 can be inserted, is formed in the upper portion of the stand part 20. The clearance hole 22 is not limited in its shape, and holes of various shapes, for example, circular holes and polygonal holes including rectangular holes can be adopted, as long as the clearance hole has such a size that a clearance is formed between the outline of the drilling tool 16 and the clearance hole. In an intermediate portion of the stand part 20, an intermediate cavity portion 25 is provided, in which a female thread 24 having a diameter at the root smaller than the inner diameter of the first through-hole 81 is formed. This female thread 24 is screw-engaged with the male thread formed in the plate member fixing bolt 34, and functions as an engaging part for engaging the plate member fixing bolt 34. In addition, a flat support portion 23, which comes into contact with the lower surface of the plate member 80, is provided on the peripheral edge of the clearance hole 22 at the upper end of the stand part 20.

In the above configuration of the drilling jig 2, the base part 30 of the drilling jig 2 is fixed with bolts 38 on the jig fixing part 10a of the bed 10. Thus, the drilling jig 2 is fixed while standing upright on the bed 10. The plate member 80 is placed on the support portion 23 of the stand part 20. During formation of the first through-hole 81, the drilling tool 16 is inserted into the plate member 80 and the plate member 80 is drilled while being placed on the stand part 20. Thus, the reaction force during insertion of the drilling tool 16 can be received with the support portion 23 of the stand part 20. In addition, since the clearance hole 22 is formed in the upper portion of the stand part 20, it is possible to prevent the inner surface of the stand part 20 from being cut by the leading end portion of the drilling tool 16 having penetrated the first through-hole 81.

After formation of the first through-holes 81, the bolt (plate member fixing bolt) 34 with a male thread formed in it is inserted into the first through-hole 81 from above the plate member 80, and the bolt 34 is screwed on the female thread 24 formed in the lower portion of the stand part 20 to thereby fix the plate member 80 on the drilling jig 2. In order to prevent damage to the plate member 80, a washer 36 may be interposed between the head of the bolt 34 and the plate member 80. Thus, the plate member 80 can be fixed on the bed 10 side by screwing the bolt 34, which has the male thread formed in it, on the female thread 24 through the first through-hole 81 of the plate member 80 and the clearance hole 22.

During formation of the second through-hole 82, the second through-hole 82 is formed with the drilling tool 16 while the plate member 80 is fixed on the drilling jig 2 and the bed 10 through at least one of the first through-holes 81. During this process, since the plate member 80 is fixed on the drilling jig 2 through at least one of the first through-holes 81, it is possible to enhance the rigidity of the plate member 80 and suppress vibration and bouncing of the plate member 80 during formation of the second through-hole 82.

The above-described configuration makes it possible to form the precise first through-holes 81 and second through-holes 82 while preventing troubles such as breakage of the drilling tool 16.

In some embodiments, a cavity portion 26 may be formed in a lower portion of the stand part 20. In this case, the cavity portion 26 is provided under the female thread 24, and communicates with the hole in which the female thread 24 is formed. Chips generated by drilling fall into and collect in this cavity portion 26. The cavity portion 26 communicates with the outside through a chip outlet 27 provided in the base portion 30 or the stand part 20. This configuration allows the chips collected in the cavity portion 26 to be discharged through the chip outlet 27 to the outside.

In one embodiment, the base part 30 extends along a direction perpendicular to the stand part 20, and a long hole 32, through which the leading end portion of the bolt 38 for fastening the base part 30 on the bed 10 can be passed, may be formed along the extension direction of the base part 30. Thus, the mounting position of the drilling jig 2 on the base part 30 can be finely adjusted by adjusting the position of the bolt 38 in the longitudinal direction of the long hole 32. A slit may be used instead of the long hole 32.

Figure 7:
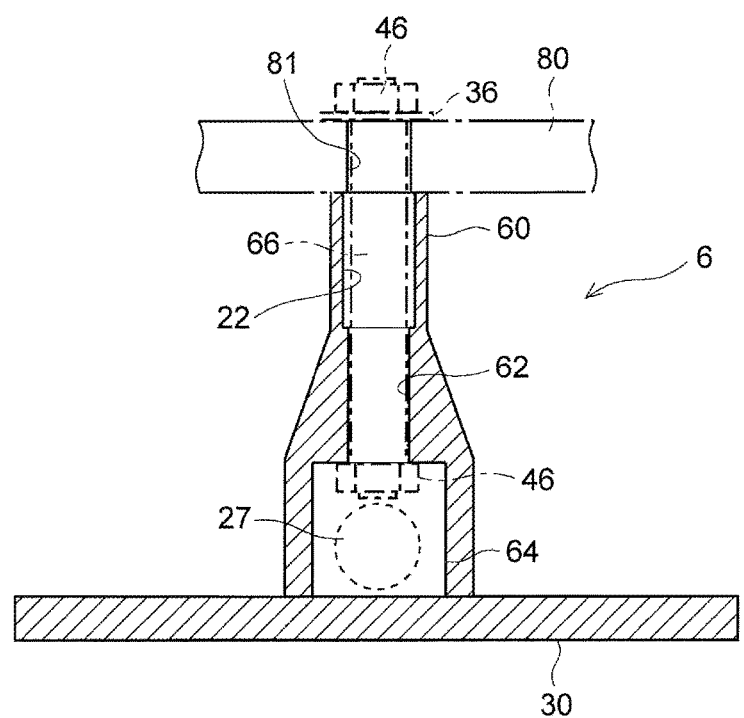
FIG. 7 is a cross-sectional view of a drilling jig according to a first modified example of the present invention.
Figure 8:
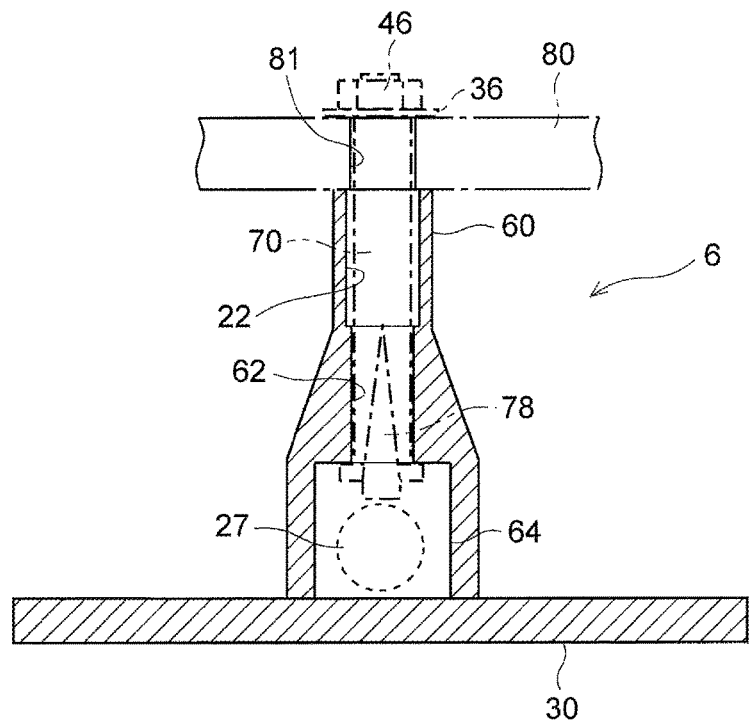
FIG. 8 is a cross-sectional view of a drilling jig according to a second modified example of the present invention.

Drilling jigs 6 according to a first modified example and a second modified example shown in FIG. 7 and FIG. 8 may be used. While the jig 2 shown in the above-described embodiment includes the female thread 24 in the intermediate portion of the stand part 20 in the vertical axial direction, the jigs 6 shown in the first modified example (FIG. 7) and the second modified example (FIG. 8) to be described below are different in that an inner wall of an intermediate portion of a stand part 60 has a smooth intermediate cavity portion 62. Since the other configurations are the same as those of the above-described embodiment, a detailed description of the same configurations will be omitted. FIG. 7 is a cross-sectional view of the drilling jig according to the first modified example of the present invention, and FIG. 8 is a cross-sectional view of the drilling jig according to the second modified example of the present invention.

While the plate member is fixed on the drilling jig by means of the fixing member, the embodiment and the first and second modified examples are different from each other in the configuration of the fixing member. That is, in the first modified example shown in FIG. 7, a double-nut bolt 66 is used for the fixing member as the means for fixing the plate member on the jig 6. No female thread is cut on the inner surface of the intermediate cavity portion 62, and the inner diameter of the intermediate cavity portion 62 is preferably smaller than the inner diameter of the clearance hole and slightly larger than the outer diameter of the double-nut bolt 66. In such a configuration, when the double-nut bolt 66 is fastened, the seat surface of the nut 46 disposed in a cavity portion 64 is brought into contact with the ceiling surface of the cavity portion 64, so that the ceiling surface of the stand part 60 can support the tensile force acting on the double-nut bolt 66. According to the first modified example, the ceiling surface of the cavity portion 64, with which the seat surface of the nut 46 comes into contact, functions as an engaging part for engaging the double-nut bolt (fixing member) 66.

As the horizontal cross-section of the cavity portion 64, in which the lower portion of the intermediate cavity portion 62 is opened, various shapes such as circles and polygonal shapes including rectangular shapes can be adopted as long as the opening of the intermediate cavity portion 62 can be disposed in the cross-section. Of the nuts 46 used for fastening the double-nut bolt 66, the nut 46 disposed in the cavity portion 64 may be tacked by spot welding etc. at the position where the intermediate cavity portion 62 is opened in the ceiling surface of the cavity portion 64. According to the configuration of the first modified example shown in FIG. 7, there is no need to provide a female thread in the intermediate cavity portion 62, which facilitates maintenance.

Figure 9A:
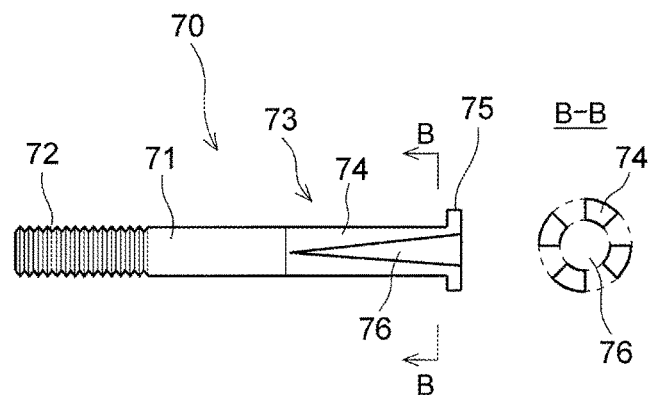
FIG. 9(a) is a side view showing a special bolt according to the second modified example of the present invention.

The second modified example shown in FIG. 8 is different from the first modified example in that a special bolt 70 and an auxiliary member (wedge 78) are adopted instead of the double-nut bolt as the fixing member shown in the first modified example. That is, as shown in FIG. 8, the second modified example is the same as the first modified example in that the drilling jig 6 is used, but is different in that the special bolt 70 shown in FIG. 9(a) is used as the fixing member. A male thread part 72 is provided on one side of the special bolt 70 in the longitudinal direction, and a lower fixing part 73 is provided on the other side, and the male thread part 72 and the lower fixing part 73 together with a main body part 71 form an integrated fixing member. The lower fixing part 73 has a structure with a hollow portion 76 having an inversed conical shape formed on the inside in the axial direction and a four-leg strut part 74 formed on the outer peripheral side by dividing the outer circumference into eight parts and cutting the inside and a part of the circumference (cross-section B-B). Due to this configuration, each leg of the strut part 74 has a spring property which allows elastic deformation in the radial direction of the special bolt 70. The strut part 74 includes at its end a collar portion 75 which expands in the radial direction. While the example of the strut part 74 having eight divisions (four legs) is shown, the strut part 74 is not limited to this example as long as the number of divisions is four or larger. According to the second modified example, the inner peripheral surface of the intermediate cavity portion 62, with which the outer peripheral surface of the strut part 74 comes into contact, and the ceiling surface of the cavity portion 64, with which the collar portion 75 comes into contact, function as an engaging part for engaging the special bolt (fixing member) 70.

While the jig 6 adopted in the second modified example has the clearance hole 22, the intermediate cavity portion 62, and the cavity portion 64 as with the other embodiment and modified example, it is preferable that a connection part between the clearance hole 22 and the intermediate cavity portion 62 has such a shape that the inner surfaces are connected smoothly through a slope etc. In addition, the clearance hole 22 may be slightly increased in diameter at the upper end and slightly reduced in diameter in the opening at the lower end of the intermediate cavity portion 62, and may have a conical shape with a constant slope of the inner surface from the upper end of the clearance hole 22 to the opening at the lower end of the intermediate cavity portion 62. Such a shape allows smooth movement of the special bolt 70 when it is passed, the collar portion 75 of the special bolt 70 first, through to the opening of the cavity portion 64.

Figure 9B:
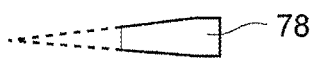
FIG. 9(b) is a cross-sectional view showing a wedge.

FIG. 9(b) shows the conical wedge 78 to be inserted into the cavity portion 64. As shown in FIG. 8, the special bolt 70 is inserted from above the plate member 80 into the stand part 60 through the through-hole 81 of the plate member 80 until the collar portion 75 appears in the cavity portion 64. In this case, the special bolt 70 is inserted, the collar portion 75 side first. When the collar portion 75 reaches the cavity portion 64, due to the spring property of the strut part 74, the collar portion 75 expands in the radial direction of the special bolt. Further, the wedge 78 is inserted from the cavity portion 64 on the other side into a cavity portion 76 formed inside the strut part 74 of the special bolt 70. As a result, the collar portion 75 and the strut part 74 further expand in the radial direction, and the outer peripheral circle of the collar portion 75 formed of the four legs (the length between outer surfaces of opposite legs of the collar portion) becomes larger than the opening of the intermediate cavity portion 62. As the nut 46 in the upper portion of the special bolt 70 is fastened, the horizontal upper surface of the collar portion 75 comes into close contact with the ceiling surface of the cavity portion 64. This operation can fix the special bolt 70 on the stand part 60 through the collar portion 75, and can thereby fix the plate member 80 on the jig 6. According to the configuration of the second modified example shown in FIG. 8, since no female thread is provided, maintenance is facilitated compared with the embodiment.

In the following, a drilling method according to the one embodiment and the modified examples will be described in detail.

A hole array composed of a plurality of positions of through-holes is previously set in the plate member 80 to be machined.

First, positions of through-holes to be the first through-holes 81 of the plurality of through-holes are selected. More specifically, as shown in FIG. 1, the jig disposition area of the plate member 80 is divided in a lattice shape by a virtual longitudinal division line 90 extending in the longitudinal direction and a virtual lateral division line 92 extending in the lateral direction. For example, the jig disposition area is divided at an about 400 mm pitch of regular intervals in both the lateral and longitudinal directions. Then, through-holes closest to intersections between the virtual longitudinal division line 90 and the virtual lateral division line 92 (including through-holes on the intersections) are selected, and these through-holes are set as the first through-holes 81. Thus, since the drilling jigs 2 are disposed at substantially regular intervals in the jig disposition area in the central part of the plate member 80, the rigidity of the jig disposition area can be enhanced substantially uniformly, which allows more proper drilling.

Next, the drilling jigs 2 are fixed on the bed 10 of the machine tool 1 as shown in FIG. 2 and FIG. 3. More specifically, at least one jig 2 is positioned with reference to a machining origin O of the machine tool 1, and the at least one jig 2 is fixed on the bed 10 with the bolt 38. In FIG. 2, the machining origin O is a machining reference point determined by the machine tool side, and a tool driving part 15', a drilling tool 16', and the plate member are positioned with reference to this machining origin.

Further, the plate member 80 is placed on the at least one jig 2, and the plate member 80 is fixed on the bed 10 with the clamp mechanism 4. In this process, the plate member 80 may be positioned with reference to the machining origin O and the plate member 80 may be placed on the at least one jig 2. It is possible to dispose the at least one jig 2 with high accuracy in a predetermined positional relation with the plate member 80 by positioning the at least one jig 2 with reference to the machining origin O of the machine tool 1 and then positioning also the plate member 80 with reference to the machining origin O.

Then, the machine tool 1 is operated so that the leading end portion of the drilling tool 16 having penetrated the plate member 80 is inserted into the clearance hole 22. The drilling tool is positioned at the position of the plate member 80 corresponding to the clearance hole 22, and the first through-hole 81 is formed. During formation of the first through-hole 81, the plate member 80 is fixed on the bed 10 with the clamp mechanism 4, while the periphery of the first through-hole 81, into which the drilling tool 16 is inserted, is supported from below by the jig 2. Therefore, it is possible to receive the reaction force during insertion of the drilling tool 16 with the jig 2 without fixing the plate member 80 on the jig 2. In addition, since vibration, bouncing, etc. of the plate member 80 can be suppressed, it is possible to form precise through-holes and prevent troubles such as breakage of the drilling tool 16.

Subsequently, the plate member fixing bolt 34 is passed through the first through-hole 81, and the plate member 80 is fixed on the at least one jig 2 with the plate member fixing bolt 34. Thus, since the plate member 80 is fixed on the bed 10 using the first through-hole 81 which has been formed first of the plurality of through-holes, even the plate member 80 having a hole array of a triangular pitch, a square pitch, etc. can be easily fixed on the bed 10.

Further, the machine tool 1 is operated to form the second through-hole 82 other than the first through-hole 81 of the plurality of through-holes. During formation of the second through-hole 82, since the plate member 80 is fixed on the bed 10 with the plate member fixing bolt 34 passed through the first through-hole 81, the rigidity of the plate member 80 can be enhanced and vibration and bouncing of the plate member 80 can be suppressed. Accordingly, it is possible to form precise through-holes while preventing troubles such as breakage of the drilling tool 16. In addition, it is possible to freely adjust the rigidity of the plate member 80 around the second through-hole 82 by appropriately selecting the positions of the first through-holes 81, namely, the installation positions of the plate member fixing bolts 34.

In one embodiment, when the plate member 80 is fixed on the bed 10 with the clamp mechanism 4, the outer peripheral side of the plate member 80 relative to the jig disposition area of the at least one jig 2 may be fixed on the bed 10 with the clamp mechanism 4. During formation of the first through-hole 81, the first through-hole 81 may be formed while the jig disposition area of the plate member 80 is supported from below with the at least one jig 2 and the outer peripheral side of the plate member 80 is fixed with the clamp mechanism 4. Thus, it is possible to drill properly even when a large number of through-holes are located in the central part of the plate member 80, by receiving the reaction force of the plate member 80 with the jig, which supports the jig disposition area from below, while securing the restraining force on the plate member 80 with the clamp mechanism 4 which fixes the outer peripheral side relative to the jig disposition area.

In one embodiment, the drilling tool 16 may be a cemented carbide drill. Then, it is possible to drill at a high speed and reduce the machining time as well as to form more precise through-holes.

Figure 10:
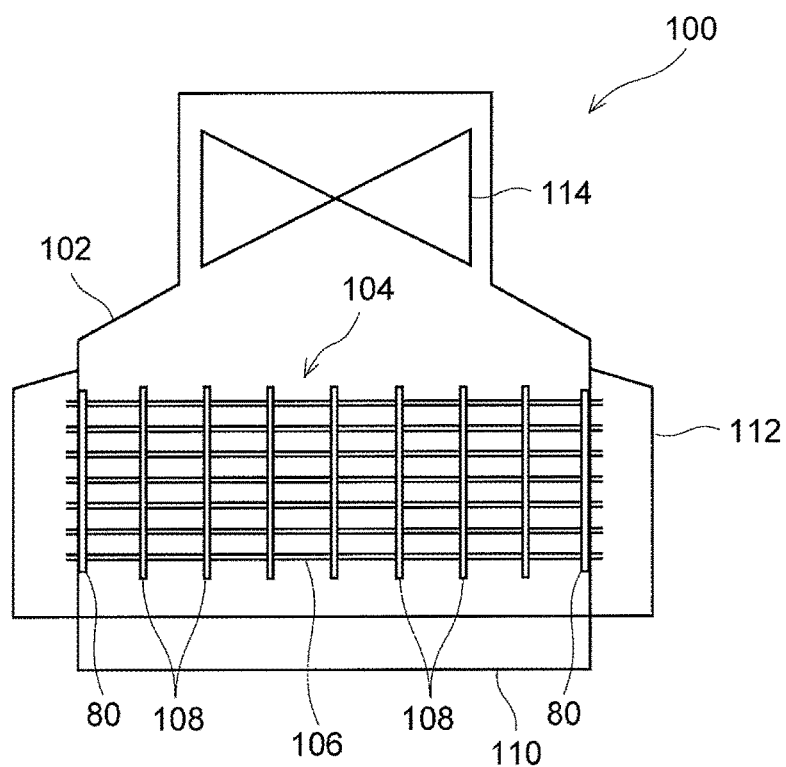
FIG. 10 is a schematic view showing a configuration example of a condenser according to one embodiment of the present invention.

Next, a condenser 100 according to one embodiment of the present invention will be described with reference to FIG. 10. FIG. 10 is a schematic view showing a configuration example of the condenser according to one embodiment of the present invention.

The condenser 100 condenses steam having been used for driving a steam turbine into water and resupplies the condensate to a boiler etc. which generates steam. In this embodiment, the condenser 100 used for a thermal power plant, a nuclear power plant, etc. is shown as an example.

As shown in FIG. 10, the condenser 100 in one embodiment has a shell 102 forming the outer shape and a cooling tube bundle 104 which is a collection of cooling tubes 106 for cooling steam. The shell 102 is provided with a water chamber 110 which forms, together with the cooling tube bundle 104, a passage for cooling water to circulate through, and a hot well 112 in which condensate being water condensed from steam is temporarily collected. A turbine part 114 of a steam turbine is disposed in an upper portion of the shell 102, and the cooling tube bundle 104 is disposed under the turbine part 114.

The plurality of cooling tube bundles 104 are disposed inside the shell 102. Each of the cooling tube bundles 104 is provided between the turbine part 114 and the hot well 112 so as to extend in the extension direction of the rotational axis of the turbine part 114.

The cooling tube bundle 104 is provided with a plurality of tube support plates 108 for supporting the cooling tubes 106. The tube support plates 108 are disposed at intervals in the extension direction of the cooling tubes 106, and retain the array of the cooling tube bundles 104.

Tube plates 80 are provided at the ends of the cooling tube bundle 104. The tube plate 80 is produced using the drilling jig 2 or the drilling method as described above. The tube support plate 108, other than the tube plate 80, may be produced using the drilling jig or the drilling method according to the embodiment.

As has been described above, according to the foregoing embodiment, it is possible to form the through-holes 81, 82 of an arbitrary hole array, and form the precise through-holes 81, 82 by suppressing vibration, bouncing, etc. of the plate member 80 during insertion of the drilling tool 16 while avoiding troubles such as breakage of the drilling tool 16.

While the embodiment of the present invention has been described in detail, it is obvious that the present invention is not limited to this embodiment and various improvements and modifications may be made within the scope of the present invention.

REFERENCE SIGNS LIST

1 Machine tool
2, 6 Drilling jig
4 Clamp mechanism
10 Bed
10a Jig fixing part
10b, 10c Clamp fixing part
12 Drilling mechanism
13 Support pillar
14 Rail
15 Tool driving part
16 Drilling tool
20, 60, 70 Stand part
22, 62 Clearance hole
23 Support portion
24, 56, 64 Female thread
26, 66 Cavity portion
27, 67 Chip outlet
30 Base part
32 Long hole
34 Plate member fixing bolt (fixing member)
62 Intermediate cavity portion
66 Double-nut bolt (fixing member)
70 Special bolt (fixing member)
38, 40, 50 Bolt (fastening member)
36, 44 Washer
41, 51, 52 Male thread
42 Presser plate
46, 54 Nut
48 Jack
47, 56 Female thread
100 Condenser
102 Shell
104 Cooling tube bundle
106 Cooling tube
108 Tube support plate
110 Water chamber
112 Hot well
114 Turbine part

The invention claimed is:

1. A drilling jig comprising:
a base part extending along a base plane; and
a stand part extending along a direction perpendicular to the base plane so as to protrude from the base part,
wherein the stand part includes:
a support portion on an upper end of the stand part for supporting a plate member which is an object to be drilled, the support portion being disposed around a clearance hole extending along the direction perpendicular to the base plane inside an upper portion of the stand part;
an engaging part under the clearance hole, the engaging part being configured to engage with a fixing member for fixing the plate member through the clearance hole, and the engaging part including a female thread which is configured to be screw-engaged with a male thread defined in the fixing member;
a cavity portion between the engaging part and the base part in the direction perpendicular to the base plane, on a center axis of the clearance hole; and
a chip outlet in communication with the cavity portion.

2. The drilling jig according to claim 1, wherein the female thread has a diameter at a root which is smaller than an inner diameter of the clearance hole.

3. The drilling jig according to claim 1, wherein the female thread has a diameter at a root which is smaller than an inner diameter of a through-hole that is defined in the plate member using the drilling jig.

4. The drilling jig according to claim 1, wherein the clearance hole has an inner diameter which is larger than an inner diameter of a through-hole that is defined in the plate member using the drilling jig.

5. The drilling jig according to claim 1, wherein a slit or an elongated hole, through which a leading end portion of a fastening member for fastening the base part on a bed can be passed, is defined in the base part along an extension direction of the base part.

* * * * *